United States Patent
Lindblad et al.

(10) Patent No.: US 7,127,469 B2
(45) Date of Patent: Oct. 24, 2006

(54) XML DATABASE MIXED STRUCTURAL-TEXTUAL CLASSIFICATION SYSTEM

(75) Inventors: Christopher Lindblad, Berkeley, CA (US); Paul Pedersen, Palo Alto, CA (US)

(73) Assignee: Mark Logic Corporation, San Mateo, CA (US)

( * ) Notice: Subject to any disclaimer, the term of this patent is extended or adjusted under 35 U.S.C. 154(b) by 103 days.

(21) Appl. No.: 10/461,935

(22) Filed: Jun. 13, 2003

(65) Prior Publication Data

US 2004/0103091 A1    May 27, 2004

Related U.S. Application Data

(60) Provisional application No. 60/388,714, filed on Jun. 13, 2002.

(51) Int. Cl.
*G06F 17/30* (2006.01)

(52) U.S. Cl. ........................................................ 707/102

(58) Field of Classification Search ............. 707/1–10, 707/100–104.1, 513
See application file for complete search history.

(56) References Cited

U.S. PATENT DOCUMENTS

| | | | |
|---|---|---|---|
| 5,493,678 A | 2/1996 | Arcuri et al. | |
| 5,970,490 A | 10/1999 | Morgenstern | |
| 6,334,125 B1 | 12/2001 | Johnson et al. | |
| 6,366,934 B1 | 4/2002 | Cheng et al. | |
| 6,438,540 B1 | 8/2002 | Nasr et al. | |
| 6,510,406 B1 | 1/2003 | Marchisio | |
| 6,529,905 B1 | 3/2003 | Bray et al. | |
| 6,604,100 B1 * | 8/2003 | Fernandez et al. | 707/3 |
| 6,635,089 B1 | 10/2003 | Burkett et al. | |
| 6,654,734 B1 | 11/2003 | Mani et al. | |
| 6,678,705 B1 | 1/2004 | Berchtold et al. | |
| 6,745,208 B1 | 6/2004 | Berg et al. | |
| 6,757,646 B1 | 6/2004 | Marchisio | |
| 6,785,673 B1 * | 8/2004 | Fernandez et al. | 707/3 |
| 6,785,685 B1 * | 8/2004 | Soetarman et al. | 707/101 |
| 6,804,677 B1 * | 10/2004 | Shadmon et al. | 707/101 |
| 6,826,726 B1 | 11/2004 | Hsing et al. | |
| 6,859,455 B1 | 2/2005 | Yazdani et al. | |
| 6,882,995 B1 | 4/2005 | Nasr et al. | |
| 6,889,226 B1 | 5/2005 | O'Neil et al. | |
| 6,901,410 B1 | 5/2005 | Marron et al. | |
| 6,912,538 B1 | 6/2005 | Stapel et al. | |
| 6,966,027 B1 | 11/2005 | Krasinski | |
| 2001/0037345 A1 * | 11/2001 | Kiernan et al. | 707/513 |
| 2001/0049675 A1 | 12/2001 | Mandler et al. | |
| 2002/0029229 A1 | 3/2002 | Jakopac et al. | |
| 2002/0030703 A1 | 3/2002 | Robertson et al. | |
| 2002/0038319 A1 | 3/2002 | Yahagi | |
| 2002/0059204 A1 | 5/2002 | Harris | |
| 2002/0073119 A1 | 6/2002 | Richard | |
| 2002/0085002 A1 | 7/2002 | Lamping et al. | |

(Continued)

*Primary Examiner*—Diane Mizrahi
(74) *Attorney, Agent, or Firm*—Philip H. Albert; Townsend and Townsend and Crew

(57) ABSTRACT

One aspect of the present invention is a system for classifying element nodes in a subtree-structured XML database. The XQE structural-textual classification system is sensitive to both the textual resemblance between document elements as well as the structural resemblance between document elements. The XQE structural-textual classification system might use the XQE parent-child index described in Lindblad II-A for the purpose of forming vectors of "terms" which encode both the structural and the textual content of XML elements. The element vectors are processed by a classifier to create class prototype vectors which can be used to classify elements as they are added to the database.

6 Claims, 11 Drawing Sheets

U.S. PATENT DOCUMENTS

| | | |
|---|---|---|
| 2002/0087596 A1 | 7/2002 | Lewontin |
| 2002/0120598 A1* | 8/2002 | Shadmon et al. .............. 707/1 |
| 2002/0170070 A1 | 11/2002 | Rising et al. |
| 2003/0167445 A1 | 9/2003 | Su et al. |
| 2003/0204515 A1 | 10/2003 | Shadmon et al. |
| 2003/0212662 A1* | 11/2003 | Shin et al. ..................... 707/2 |
| 2004/0103073 A1* | 5/2004 | Blake et al. ................... 707/1 |
| 2005/0055336 A1* | 3/2005 | Hui et al. ...................... 707/3 |

* cited by examiner

```
<citation publication_date=01/02/2002>
    <title>Cerisent XQE</title>
    <author>
        <last>Pedersen</last>
        <first>Paul</first>
    </author>
    <abstract>
        The Cerisent XQE patent application describes a
        high-performance XML search and database system.
    </abstract>
</citation>
```

FIG. 1 (Prior Art)

```
[01]    NAMESPACE  name_1  =  "uri-string_1"
[02]    NAMESPACE  name_2  =  "uri-string_2"
[03]    ...
[04]    DEFAULT ELEMENT NAMESPACE = "default-element-uri-string"
[05]    DEFAULT ELEMENT NAMESPACE = "default-function-uri-string"
[06]
[07]    DEFINE FUNCTION function_a(datatype $arg_a1, Datatype $arg_a2,...)
[08]    RETURNS  { function_expression_a }
[09]
[10]    DEFINE FUNCTION function_b(datatype $arg_b1, Datatype $arg_b2,...)
[11]    RETURNS  { function_expression_b }
[12]    ...
[13]    FOR $variable_a1 IN expression_a2, variable_a3, IN expression_a4,...
[14]    LET $variable_b1 := expression_b2, variable_b3, := expression_b4,...
[15]    FOR $variable_c1 IN expression_c2, variable_c3, IN expression_c4,...
[16]    LET $variable_d1 := expression_d2, variable_d3, := expression_d4,...
[17]    ...
[18]    WHERE  where_expression
[19]    RETURN  return_expression
[20]    SORTBY  sortby_expression
```

FIG. 2 (Prior Art)

```
<citation>
    <title>Cerisent XQE</title>
    <author>
        <last>Pedersen</last>
        <first>Paul</first>
    </author>
    <abstract>  The document describes an XML
                search and query system
    </abstract>
</citation>
```
FIG. 3
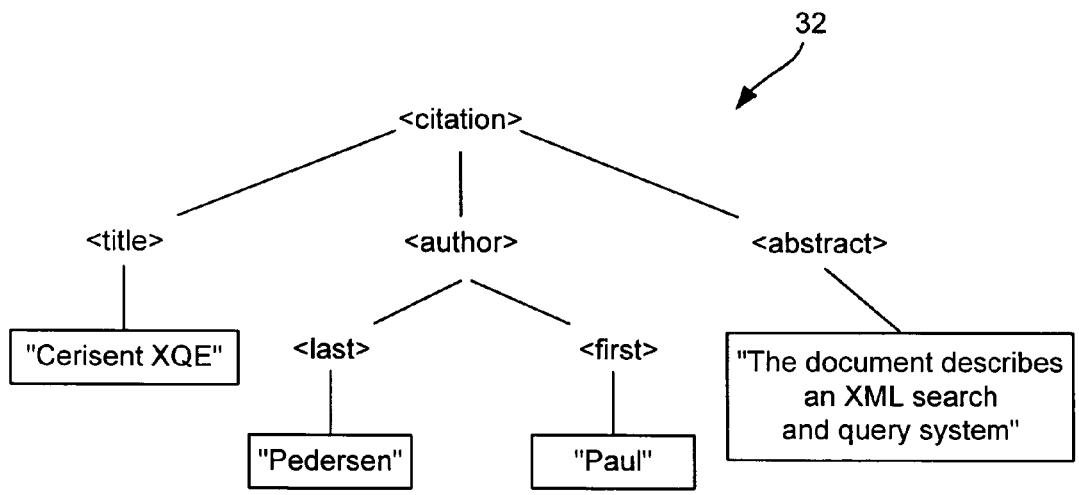
FIG. 4A
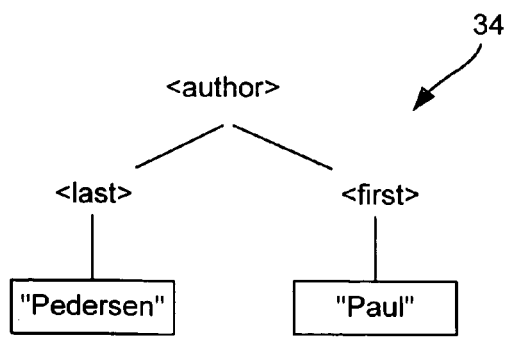
FIG. 4B

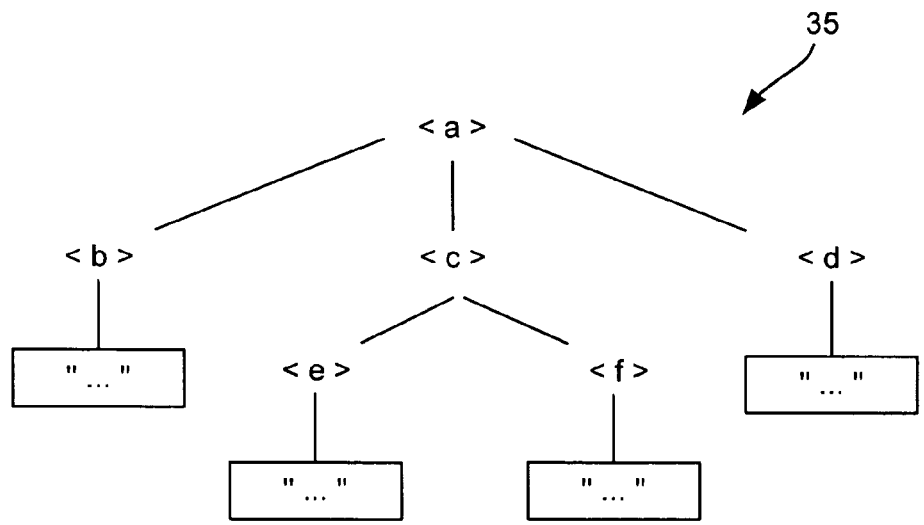
FIG. 5
< b   K = "v" > node text</b>
FIG. 6A
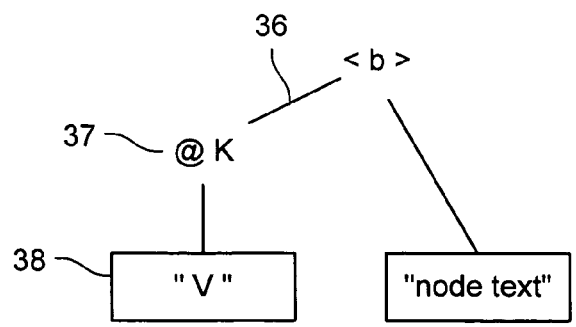
FIG. 6B

Document A:
```
< a > Alice
    < b > Bob </b>
    < b > Bill </b>
    < b > Cathy
        < d > David </d>
    < /b >
< a >
```
FIG. 11A
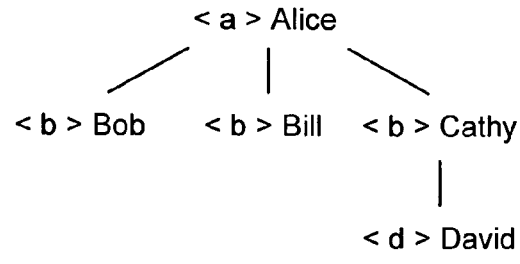
FIG. 11B
Document B:
```
< a > Cathy
    < d > Bob </d>
    < b > David </b>
< /a >
```
FIG. 11C
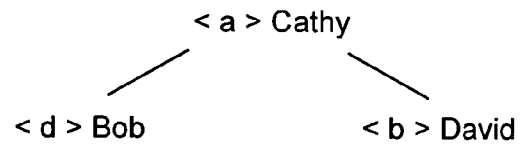
FIG. 11D
Document C:
```
< a > Alice
    < b > Bob </b>
    < b > Fred </b>
< /a >
```
FIG. 11E
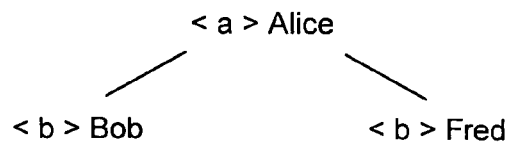
FIG. 11F

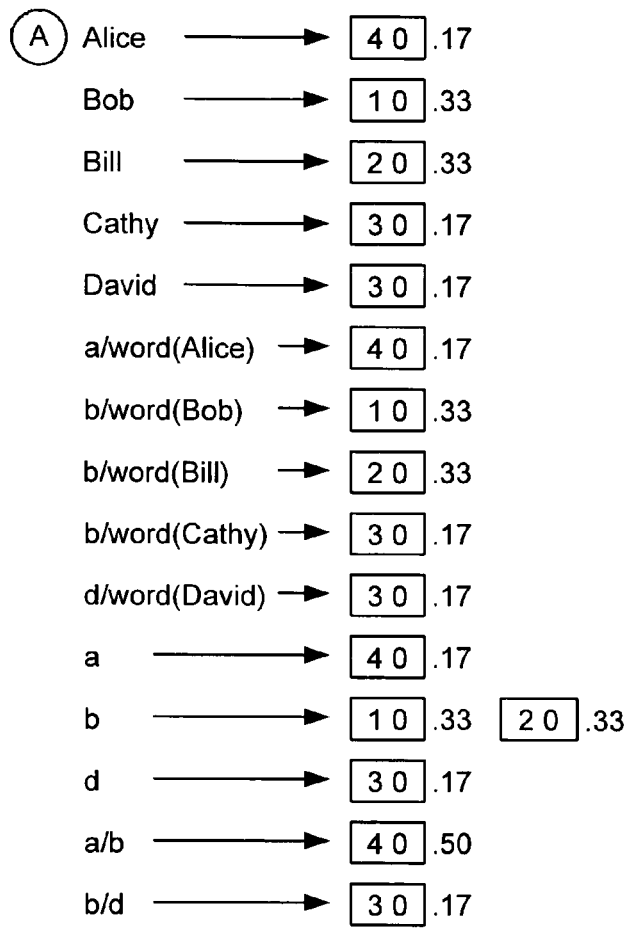
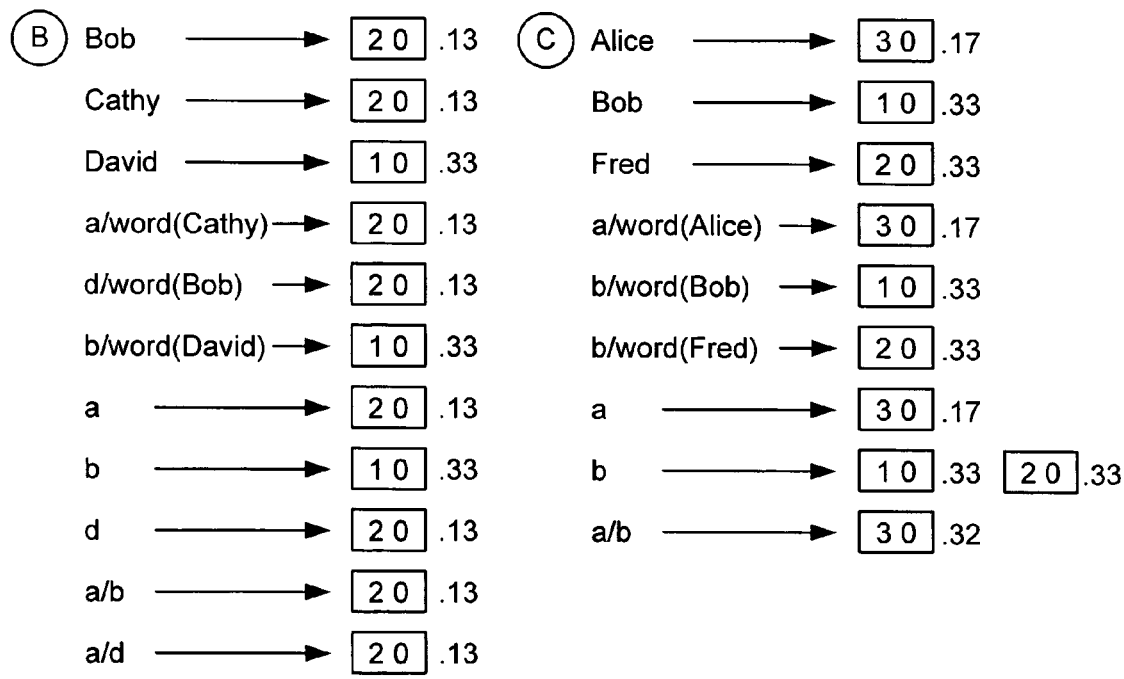
FIG. 13

$$
\begin{aligned}
d(A, B) = \quad & .33 \times .13 && (\text{"Bob"}) \\
+\ & .17 \times .13 && (\text{"Cathy"}) \\
+\ & .17 \times .33 && (\text{"David"}) \\
+\ & .17 \times .13 && (a) \\
+\ & .33 \times .33 && (b) \\
+\ & .17 \times .13 && (d) \\
+\ & .50 \times .13 && (a/b) \\
\hline
=\ & .3392
\end{aligned}
$$

$$
\begin{aligned}
d(A, C) = \quad & .17 \times .17 && (\text{"Alice"}) \\
+\ & .33 \times .33 && (\text{"Bob"}) \\
+\ & .17 \times .17 && (a/\text{word}(\text{Alice})) \\
+\ & .33 \times .33 && (b/\text{word}(\text{Bob})) \\
+\ & .17 \times .17 && (a) \\
+\ & .33 \times .33 && (b) \\
+\ & .50 \times .32 && (a/b) \\
\hline
=\ & .5934
\end{aligned}
$$

FIG. 14

XML DATABASE MIXED STRUCTURAL-TEXTUAL CLASSIFICATION SYSTEM

CROSS-REFERENCE TO RELATED APPLICATIONS

This application claims the benefit of U.S. Provisional Application No. 60/388,714, filed Jun. 13, 2002, entitled "XML DATABASE MIXED STRUCTURAL-TEXTUAL CLASSIFICATION SYSTEM," which disclosure is incorporated herein by reference for all purposes.

The present disclosure is related to the following commonly assigned co-pending U.S. patent applications:

Ser. No. 10/462,100, filed on the same date as the present application, entitled "A SUBTREE STRUCTURED XML DATABASE" (hereinafter "Lindblad I-A");

Ser. No. 10/462,019, filed on the same date as the present application, entitled "PARENT-CHILD QUERY INDEXING FOR XML DATABASES" (hereinafter "Lindblad II-A"); and Ser. No. 10/462,023, filed on the same date as the present application, entitled "XML-DB TRANSACTIONAL UPDATE SYSTEM" (hereinafter "Lindblad III-A").

The respective disclosures of these applications are incorporated herein by reference for all purposes.

BACKGROUND OF THE INVENTION

1. Field of the Invention

This invention relates in general to classification of elements in an XML database on a network, and more specifically, to classifying nodes in one or more subtree-structured XML databases over a network and methods of analysis for classification.

2. Description of Related Art

Extensible Markup Language (XML) is a restricted form of SGML, the Standard Generalized Markup Language defined in ISO 8879 and XML is one form of structuring data. XML is more fully described in "Extensible Markup Language (XML) 1.0 (Second Edition)", W3C Recommendation (6 Oct. 2000), which is incorporated by reference herein for all purposes [and available at http://www.w3.org/TR/2000/REC-xml-20001006] (hereinafter, "XML Recommendation"). XML is a useful form of structuring data because it is an open format that is human-readable and machine-interpretable. Other structured languages without these features or with similar features might be used instead of XML, but XML is currently a popular structured language used to encapsulate (obtain, store, process, etc.) data in a structured manner.

An XML document has two parts: 1) a markup document and 2) a document schema. The markup document and the schema are made up of storage units called "elements", which can be nested to form a hierarchical structure. An example of an XML markup document 10 is shown in FIG. 1. Document 10 (at least the portions shown) contains data for one "citation" element. The "citation" element has within it a "title" element, and "author" element and an "abstract" element. In turn, the "author" element has within it a "last" element (last name of the author) and a "first" element (first name of the author). Thus, an XML document comprises text organized in freely-structured outline form with tags indicating the beginning and end of each outline element.

Generally, an XML document comprises text organized in freely-structured outline form with tags indicating the beginning and end of each outline element. In XML, a tag is delimited with angle brackets followed by the tag's name, with the opening and closing tags distinguished by having the closing tag beginning with a forward slash after the initial angle bracket.

Elements can contain either parsed or unparsed data. Only parsed data is shown for document 10. Unparsed data is made up of arbitrary character sequences. Parsed data is made up of characters, some of which form character data and some of which form markup. The markup encodes a description of the document's storage layout and logical structure. XML elements can have associated attributes, in the form of name-value pairs, such as the publication date attribute of the "citation" element. The name-value pairs appear within the angle brackets of an XML tag, following the tag name.

XML schemas specify constraints on the structures and types of elements and attribute values in an XML document. The basic schema for XML is the XML Schema, which is described in "XML Schema Part 1: Structures", W3C Working Draft (24 Sep. 1999), which is incorporated by reference herein for all purposes [and available at http://www.w3.org/TR/1999/WD-xmlschema-1-19990924]. A previous and very widely used schema format is the DTD (Document Type Definition), which is described in the XML Recommendation.

Since XML documents are typically in text format, they can be searched using conventional text search tools. However such tools might ignore the information content provided by the structure of the document, one of the key benefits of XML. Several query languages have been proposed for searching and reformatting XML documents that do consider the XML documents as structured documents. One such language is XQuery, which is described in "XQuery 1.0: An XML Query Language", W3C Working Draft (20 Dec. 2001), which is incorporated by reference herein for all purposes [and available at http://www.w3.org/TR/XQuery]. An example of a general form for an XQuery query is shown in FIG. 2. Note that the ellipses at line [03] indicate the possible presence of any number of additional namespace prefix to URI mappings, the ellipses at line [12] indicate the possible presence of any number of additional function definitions and the ellipses at line [17] indicate the possible presence of any number of additional FOR or LET clauses.

XQuery is derived from an XML query language called Quilt [described at http://www.almaden.ibm.com/cs/people/chamberlin/quilt.html], which in turn borrowed features from several other languages, including XPath 1.0 [described at http://www.w3.org/TR/XPath.html], XQL [described at Http://www.w3.org/TandS/QL/QL98/pp/xql.html], XML-QL [described at http://www.research.att.com/~mfflfiles/final.html] and OQL.

Query languages predated the development of XML and many relational databases use a standardized query language called SQL, as described in ISO/IEC 9075-1:1999. The SQL language has established itself as the linquafranca for relational database management and provides the basis for systems interoperability, application portability, client/server operation, and distributed databases. XQuery is proposed to fulfill a similar same role with respect to XML database systems. As XML becomes the standard for information exchange between peer data stores, and between client visualization tools and data servers, XQuery may become the standard method for storing and retrieving data from XML databases.

With SQL query systems, much work has been done on the issue of efficiency, such as how to process a query, retrieve matching data and present that to the human or computer query issuer with efficient use of computing resources to allow responses to be quickly made to queries. As XQuery and other tools are relied on more and more for querying XML documents, efficiency will be more essential.

One problem with data analysis is that qualities of data often need to be determined for classification, comparison or other analytical purposes. A simple quality is whether or not the data contains a specified element. With text documents, an inquiry can be made as to whether a text document contains a string of interest. A search system, for example, can find all files in a corpus that contain a particular string, set of strings, regular expression, etc. Another analysis that can be done on data is comparison for similarity. Many techniques have been developed to measure similarity among data sets. Where the data being tested comprises text documents, well-developed techniques could be used to determine a similarity measure between two text documents. Where the data being tested comprises database tables, a similarity measure might be based on whether the records of one database contain the same or similar data elements in given locations in those records as data elements in another database in corresponding locations.

While many comparison and similarity measuring techniques have been developed, most are unsuitable to properly analyze certain data, such as structured text as might be found in an XML document

BRIEF SUMMARY OF THE INVENTION

One aspect of the present invention is a system for classifying element nodes in a subtree-structured XML database. The XQE structural-textual classification system is sensitive to both the textual resemblance between document elements as well as the structural resemblance between document elements. The XQE structural-textual classification system might use the XQE parent-child index described in Lindblad II-A for the purpose of forming vectors of "terms" which encode both the structural and the textual content of XML elements. The element vectors are processed by a classifier to create class prototype vectors which can be used to classify elements as they are added to the database.

BRIEF DESCRIPTION OF THE DRAWINGS

FIG. 1 is an illustration of XML markup.

FIG. 2 is an illustration of an XQuery query.

FIG. 3 is an illustration of a simple XML document including text and markup.

FIG. 4 is a schematic representation of the XML document shown in FIG. 3; FIG. 4A illustrates a complete representation the XML document and FIG. 4B illustrates a subtree of the XML document.

FIG. 5 is a schematic representation of a more concise XML document.

FIG. 6 illustrates a portion of an XML document that includes tags with attributes; FIG. 6A shows the portion in XML format; FIG. 6B is a schematic representation of that portion in graphical form.

FIG. 11 illustrates the documents to be compared.

FIG. 13 illustrates posting lists for the documents shown in FIG. 1, including terms scores for word terms, structure terms, and combination terms.

FIG. 14 illustrates a calculation of normalized aggregate scores for pairs of the documents shown in FIG. 11.

DETAILED DESCRIPTION OF THE INVENTION

Figure 7:
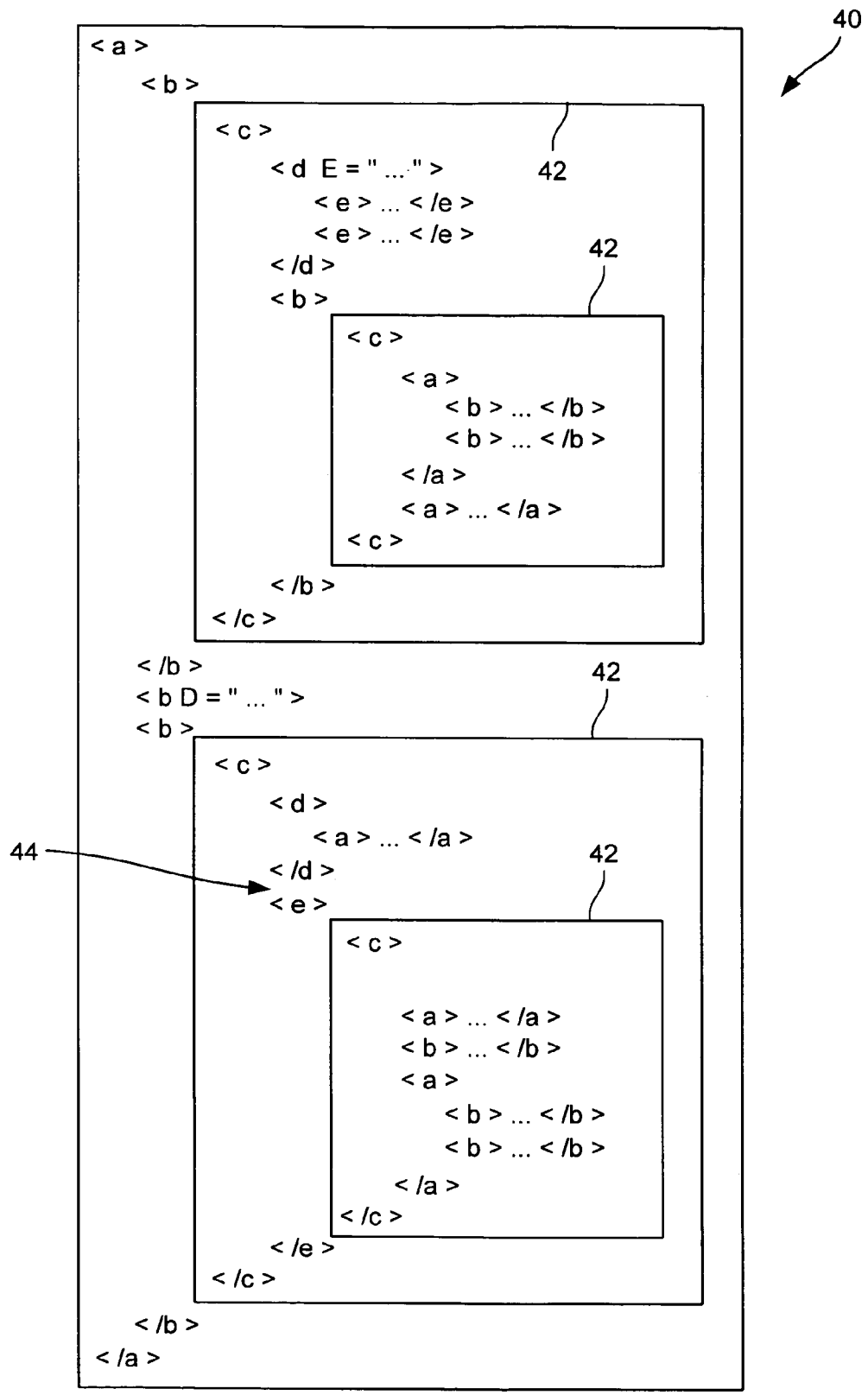
FIG. 7 shows a more complex example of an XML document, having attributes and varying levels.

This detailed description illustrates some embodiments of the invention and variations thereof, but should not be taken as a limitation on the scope of the invention. In this description, structured documents are described, along with their processing, storage and use, with XML being the primary example. However, it should be understood that the invention might find applicability in systems other than XML systems, whether they are later-developed evolutions of XML or entirely different approaches to structuring data.

Overview

Systems for generating and managing XML databases are described in Lindblad I-A. The nodes may be of any type, such as element nodes, attribute nodes, text nodes, processing instruction nodes or comment nodes. The notation u(n) is used herein to indicate an update operation u applied to the node n. "Elements" are generally understood in the context of XML documents, but would also apply where the data being manipulated is other than XML documents. As used herein, an XML element comprises a tag name, zero or more attribute (name, value) pairs, and element content. Element content is typically zero or more characters of text and zero or more child elements, but element content might take other forms.

An update system as described herein applies updates to XML nodes in an XML database. In an XML handling system according to one embodiment of the present invention, point updates to an element of an XML document stored in the XML database are possible. Updates might add or delete whole documents, add child nodes to a parent node where the child node is another XML element or an attribute of an existing XML element, adding new siblings to a node, deleting a node, replacement of a node by a new node, etc.

Lindblad I-A describes how a collection of XML documents might be decomposed into a "forest" of "subtrees", where each subtree describes a fragment within one of the XML documents.

Subtrees, Storage and Decomposition

Subtree storage is described in this section. Subtree storage is explained with reference to a simple example, but it should be understood that such techniques are equally applicable to more complex examples.

FIG. 3 illustrates an XML document 30, including text and markup. FIG. 4A illustrates a schematic representation 32 of XML document 30, wherein schematic representation 12 is a shown as a tree (a connected acyclic simple directed graph) with each node of the tree representing an element of the XML document or an element's content, attribute, the value, etc.

In a convention used for the figures of the present application, directed edges are oriented from an initial node that is higher on the page than the edge's terminal node, unless otherwise indicated. Nodes are represented by their labels, often with their delimiters. Thus, the root node in FIG. 4A is a "citation" node represented by the label delimited with "<>". Data nodes are represented by rectangles. In many cases, the data node will be a text string, but other data node types are possible. In many XML files, it is possible to have a tag with no data (e.g., where a sequence such as "<tag></tag>" exists in the XML file). In such cases, the XML file can be represented as shown in FIG. 4A but with some nodes representing tags being leaf nodes in the tree. The present invention is not limited by such variations, so to focus explanations, the examples here assume that each "tag" node is a parent node to a data node (illustrated by a rectangle) and a tag that does not surround any data is illustrated as a tag node with an out edge leading to an empty rectangle. Alternatively, the trees could just have leaf nodes that are tag nodes, for tags that do not have any data.

As used herein, "subtree" refers to a set of nodes with a property that one of the nodes is a root node and all of the other nodes of the set can be reached by following edges in the orientation direction from the root node through zero or more non-root nodes to reach that other node. A subtree might contain one or more overlapping nodes that are also members of other "inner" or "lower" subtrees; nodes beyond a subtree's overlapping nodes are not generally considered to be part of that subtree. The tree of FIG. 4A could be a subtree, but the subtree of FIG. 4B is more illustrative in that it is a proper subset of the tree illustrated in FIG. 4A.

To simplify the following description and figures, single letter labels will be used, as in FIG. 5. Note that even with the shorted tags, tree 35 in FIG. 5 represents a document that has essentially the same structure as the document represented by the tree of FIG. 4A.

Some nodes may contain one or more attributes, which can be expressed as (name, value) pairs associated with nodes. In graph theory terms, the directed edges come in two flavors, one for a parent-child relationship between two tags or between a tag and its data node, and one for linking a tag with an attribute node representing an attribute of that tag. The latter is referred to herein as an "attribute edge". Thus, adding an attribute (key, value) pair to an XML file would map to adding an attribute edge and an attribute node, followed by an attribute value node to a tree representing that XML file. A tag node can have more than one attribute edge (or zero attribute edges). Attribute nodes have exactly one descendant node, a value node, which is a leaf node and a data node, the value of which is the value from the attribute pair.

In the tree diagrams used herein, attribute edges sometimes are distinguished from other edges in that the attribute name is indicated with a preceding "@". FIG. 6A illustrates a portion of XML markup wherein a tag T has an attribute name of "K" and a value of "V". FIG. 6B illustrates a portion of a tree that is used to represent the XML markup shown in FIG. 6A, including an attribute edge 36, an attribute node 37 and a value node 38. In some instances, tag nodes and attribute nodes are treated the same, such as indexing sequences and the like, but other times are treated differently. To easily distinguish tag nodes and attribute nodes in the illustrated trees, tag nodes are delimited with surrounding angle brackets ("<>"), while attribute nodes are be limited with an initial "@".

Figure 8:
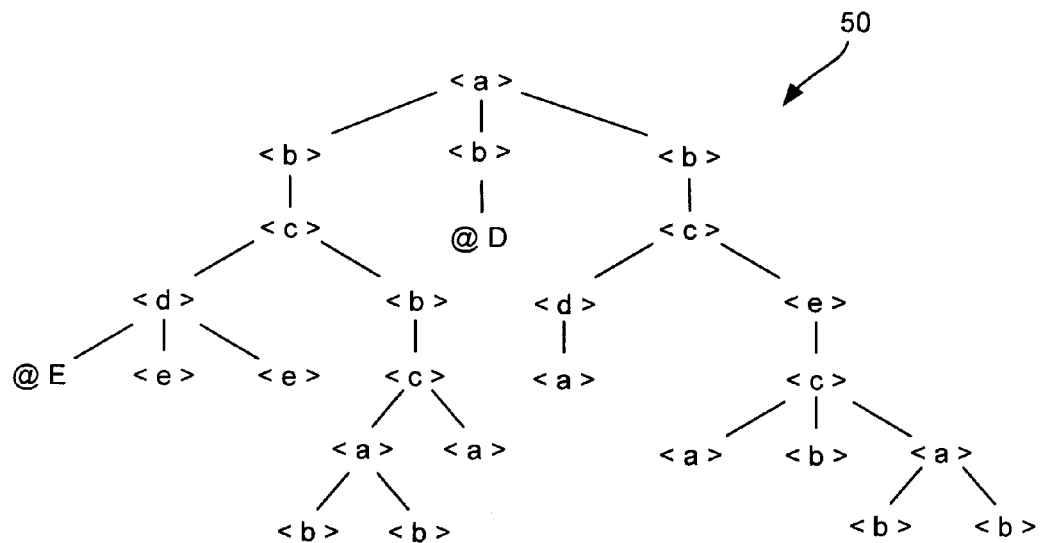
FIG. 8 is a schematic representation of the XML document shown in FIG. 7, omitting data nodes.

FIG. 7 et seq. illustrate a more complex example, with multiple levels of tags, some having attributes. FIG. 7 shows a multi-level XML document 40. As is explained later below, FIG. 7 also includes indications 42 of where multi-level XML document 40 might be decomposed into smaller portions. FIG. 8 illustrates a tree 50 that schematically represents multi-level XML document 40 (with a data nodes omitted).

Figure 9:
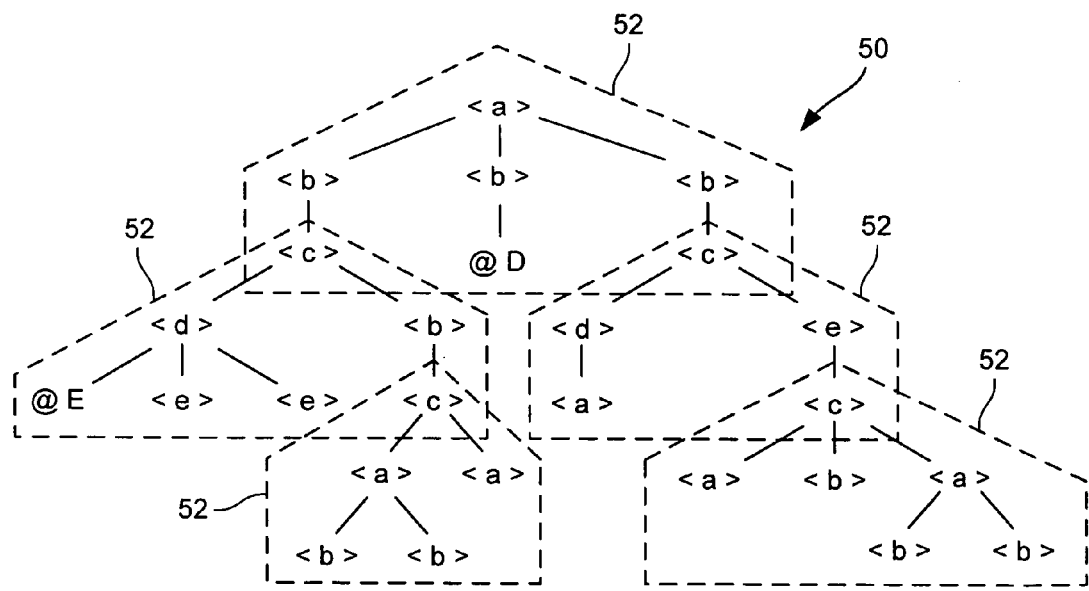
FIG. 9 illustrates one decomposition of the XML document illustrated in FIGS. 7–8.

FIG. 9 shows one decomposition of tree 50 with subtree borders 52 that correspond to indications 42. Each subtree border 52 defines a subtree; each subtree has a subtree root node and zero or more descendant nodes and some of the descendant nodes might in turn be subtree root nodes for lower subtrees. In this example, the decomposition points are entirely determined by tag labels (e.g., each tag with a label "c" becomes a root node for a separate subtree, with the original tree root node being the root node of a subtree extending down to the first instances of tags having tag labels "c"). In other examples, decomposition might be done using a different set of rules. For example, the decomposition rules might be to break at either a "c" tag or an "f" tag, break at a "d" tag when preceded by an "r" tag, etc. Decomposition rules need not be specific to tag names, but can specify breaks upon occurrence of other conditions, such as reaching a certain size of subtree or subtree content. Some decomposition rules might be parameterized where parameters are supplied by users and/or administrators (e.g., "break whenever a tag is encountered that matches a label the user specifies", or more generally, when a user-specified regular expression or other condition occurs).Note from FIG. 9 that subtrees overlap. In a subtree decomposition process, such as one prior to storing subtrees in a database or processing subtrees, it is often useful to have nonoverlapping subtree borders. Assume that two subtrees overlap as they both include a common node. The subtree that contains the common node and parent(s) of the common node is referred to herein as the upper overlapping subtree, while the subtree that contains the common node and child(ren) of the common node is referred to herein as the lower overlapping subtree.

Figure 10:
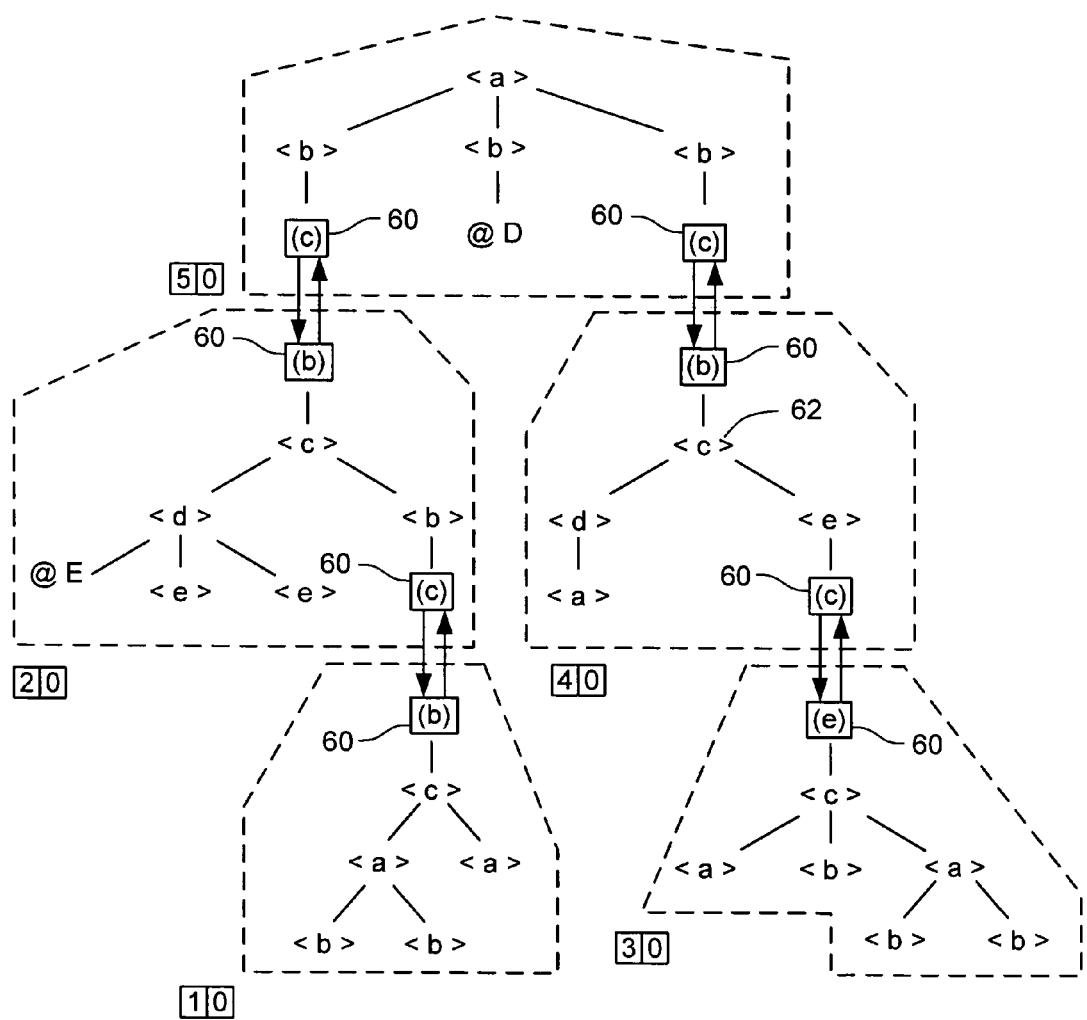
FIG. 10 illustrates the decomposition of FIG. 9 with the addition of link nodes.

FIG. 10 illustrates one approach to having nonoverlapping subtrees, namely by introducing the construct of link nodes 60. For each common node, an upper link node is added to the upper subtree and a lower link node is added to the lower subtree. These link nodes are shown in the figures by squares. The upper link node contains a pointer to the lower link node, which in turn contains a pointer to the root node of the lower overlapping subtree (which was the common node), while the lower link node contains a pointer to the upper link node, which in turn contains a pointer to the parent node of what was the common node. Each link node might also hold a copy of the other link node's label possibly along with other information. Thus, the upper link node may hold a copy of the lower subtree's root node label and the lower link node may hold a copy of the upper subtree's node label for the parent of what was the common node.

Characterization

As used herein, "characterization" refers to determining some quality of an input data set that can be used for analysis of that data set or a collection of data sets. Analysis can take a number of forms, such as decision-making, comparing or classifying. Decision-making might include conditional processing steps. Comparing could be done to determine if two or more data sets are the same, similar, dissimilar or entirely different. Classifying involves associating each data set that is classified into one or more classes.

Examples, not to be construed as limiting, will be used to illuminate these concepts. Text documents stored in electronic directories could be data sets that are characterized. Suppose a simple analysis is done to determine the quality "size", i.e., how large each file is. In many cases, this is simply a matter of processing each text document to count the number of characters present in the document or querying a directory structure to read out a file size.

Based on that quality (size), the collection of data sets (the text documents) could be analyzed for decision-making. For example a process might have instructions to examine the quality and if a condition size>threshold is met, compress the text document, otherwise leave it alone. This is a decision-making process. In a much more complex example, the data sets could be data about a company and the decision-making process is to decide whether or not to invest in the company.

Comparing is another type of analysis, wherein two or more data sets are compared. For example, using just the quality described above, a comparing process could determine that text document A is larger than text document B. Other such comparisons might indicate that text document A has longer words on average than text document B. With some comparisons, the quality is such that it is very likely to be different among two different documents, in which case that quality can be used to perform a comparison analysis to find identical data sets. Many checksum schemes have this property; the quality of a data set would be its checksum.

Classifying is yet another type of analysis. For example, each text document might have a letter histogram determined for it. The "quality" would then be the histogram. Note that not all qualities need be single valued. A classification analysis might use the histogram of a text document to classify it as being a document written in a particular language. One technique for classification is the use of a support vector machine (SVM). With a support vector machine, each item to be classified is assigned a quality that can be thought of as an n-dimensional vector locating the item in an n-dimensional coordinate system. The support vector machine then identifies a plane, curve or hyperplane that separates classes of items. Once the separators are identified, then classification is a process of identifying the quality factor for the item and mapping it to the coordinate system.

Determining Qualities of XML Datasets

In the preceding examples, the data sets are text documents. Much research and many systems are known for characterizing test documents and analyzing the resulting qualities. For example, a search engine characterizes text documents by their content words, relative placement and occurrence of words and possibly their storage location and an analysis process selects text documents by whether or not they meet some specified search query constraint. In many cases, where the data sets are XML documents, they are often characterized as if they were just text documents. This does not yield desirable results in many cases.

Determining a quality of an XML dataset, usually as a precursor to an analysis step, according to aspects of the present invention involve considering not just the structure or just the text, but both the text (or other type of element content for non-text elements) and the structure of the XML dataset. In some embodiments, the parent-child indexing of Lindblad II-A is used to facilitate searching and comparing element content and structure. In an XML file, the element content is the content of an element, which might be identified by a tag and markup. Typically, but not always, the content of an XML element is text. In some views, XML element content also includes tag elements that are within that XML element, but for simplicity, without limitation, XML documents are described herein as comprising a tree of tag elements with some tag elements having attributes (shown as branches in the tree), and each tag element having content (possibly null), zero or more children nodes and zero or more attributes, which are (name, value) pairs.

Qualities can be determined through a query process. For example, posing the query "Which XML documents contain the phrase 'lorem ipsum'?" would determine which XML documents have the quality of containing that phrase. Lindblad II-A describes ways to pose queries efficiently where the queries might contain structural-textual information. Table 1 illustrates some of those queries, with varying levels of structure and text. As shown therein, some queries are considered query content sequences, some queries are considered query structure sequences and some queries have both. For example, query (a) is a query structure sequence in that it matches an element, while query (b) is a query content sequence in that it matches content. Query (m) is clearly a query with both.

TABLE 1

Examples of Queries

| This query . . . | matches a(n): | Example |
|---|---|---|
| One-Step Queries | | |
| (a) elem | element | (tag) singleton |
| (b) word::wrd | word | (word) singleton |
| Two-Step Queries | | |
| (c) elem/word::wrd | element/word | (tag, word) pair |
| (d) elem|word::[string] | element/string-value | (tag, string) pair |
| (e) elem/child | element/child | (tag, tag) pair |
| (f) elem/@attr | element/attribute-name | (tag, attr) pair |
| Three-Step Queries | | |
| (g) elem/@attr/word::wrd | element/attribute-name/attribute-word | (tag, attr, word) triple |
| (h) elem/@attr/word::[string] | element/attribute-name/attribute-value | (tag, attr, string) triple |
| (i) elem/child/word::wrd | element/child/word | (tag, tag, word) triple |
| (j) elem/child/word::[string] | element/child/string-value | (tag, tag, string) triple |
| (k) parent/elem/child | parent/element/child | (tag, tag, tag) triple |
| Four-Step Queries | | |
| (l) elem/child/@attr/word::wrd | element/child/attribute-name/attribute-word | (tag, tag, attr, word) quadruple |

TABLE 1-continued

Examples of Queries

| This query . . . | matches a(n): | Example |
| --- | --- | --- |
| (m) elem/child/@attr/word::[string] | element/child/attribute-name/attribute-value | (tag, tag, attr, string) quadruple |
| (n) parent/elem/child/word::wrd | element/child/grand-child/word | (tag, tag, tag, word) quadruple |
| (o) parent/elem/child/word::[string] | parent/element/child/string-value | (tag, tag, tag, string) quadruple |
| (p) grandp/parent/elem/child | grand-parent/parent/element/child | (tag, tag, tag, tag) quadruple |

. . .
K-Step Queries
. . .

By including a wide range of structural and structural-textual terms in the index, the XQE structural-textual classifier is able to find structural resemblance between textually distinct XML elements.

Example of Determining a Quality

In this example, a quality is determined for three XML documents for use in a similarity analysis. More specifically, a metric distance is to be found for each pair of documents to determine which documents are most similar.

FIG. 11 illustrates the tree structures (11A, 11C, 11E) for three documents as well as the corresponding XML fragments (11B, 11D, 11F). In FIG. 11 and following figures, text noted content is a shown adjacent to its corresponding element note. The analysis is to determine which XML documents are more similar based on its text and structure.

Figure 12A:
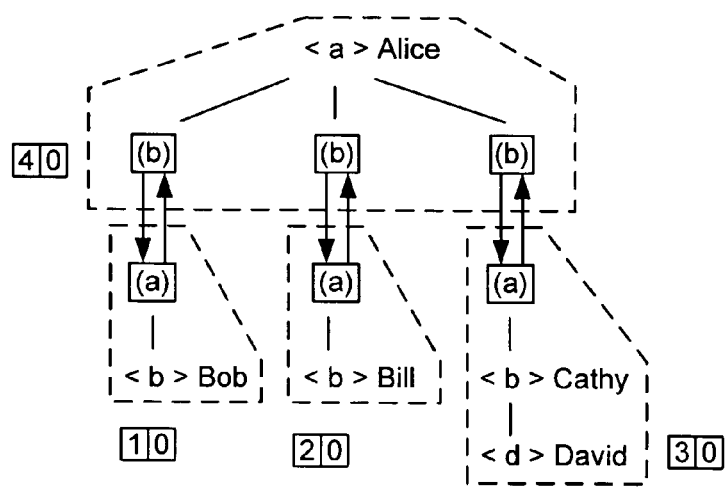
FIG. 12 illustrates a decomposition of the documents shown in FIG. 11.
Figure 12B:
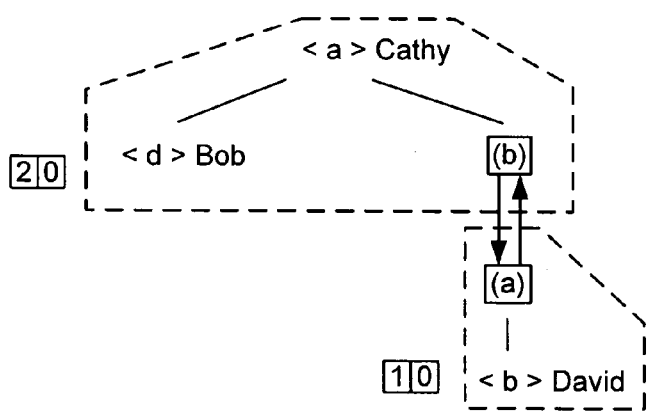
Figure 12C:
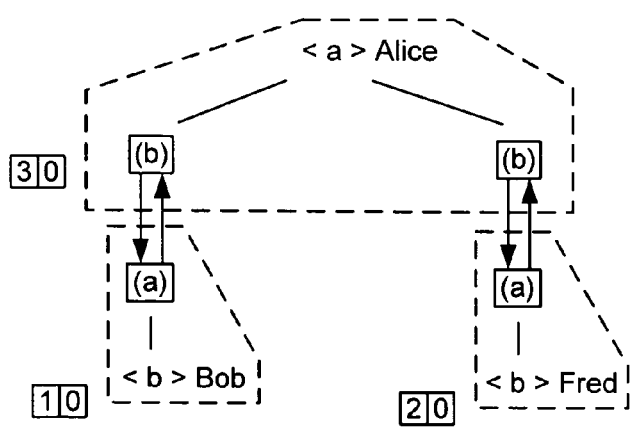

FIG. 12 illustrates how each of the documents would be decomposed into subtree fragments as described above. The decomposition rule used here is to fragment at each element with a tag label of "b".

FIG. 13 illustrates posting list structures for words, elements, element-word pairs, and element-child terms. Note that some of the entries relate to text strings, some of the entries relate to combinations of structure and text strings and some of the entries relate to structure. The derivation and determination of posting lists is described in more detail in Lindblad II-A, but it can be seen that for each term listed, a list of the subtrees that contain that term are shown, along with a score for each of the terms.

FIG. 14 illustrates how an analysis is system might determine the metric distance between two documents. The top part of FIG. 14 shows the calculations for a metric distance between document A and document B, while the bottom part of FIG. 14 shows the calculations for a metric distance between document A and document C.

While many different methods are possible for calculating a metric distance, in this case the metric distance between two documents is proportional to a normalized aggregate score for each term using a "cosine measure", wherein the normalized sum of the products of corresponding term scores is the normalized aggregate score. In the figure, term scores that are zero are omitted.

As indicated, document A is judged to be closer to document C than to document B. Notably, this approach allows for the systematic inclusion of terms that encode structural properties of the documents and not just raw word frequencies. Although document C shares fewer words in common with document A, the words that are shared with document A are in the same structural positions as text associated with light element noted tags, resulting in the determination that document C really is more like document A than document B is like document A.

Description of SVM Unit

Figure 15:
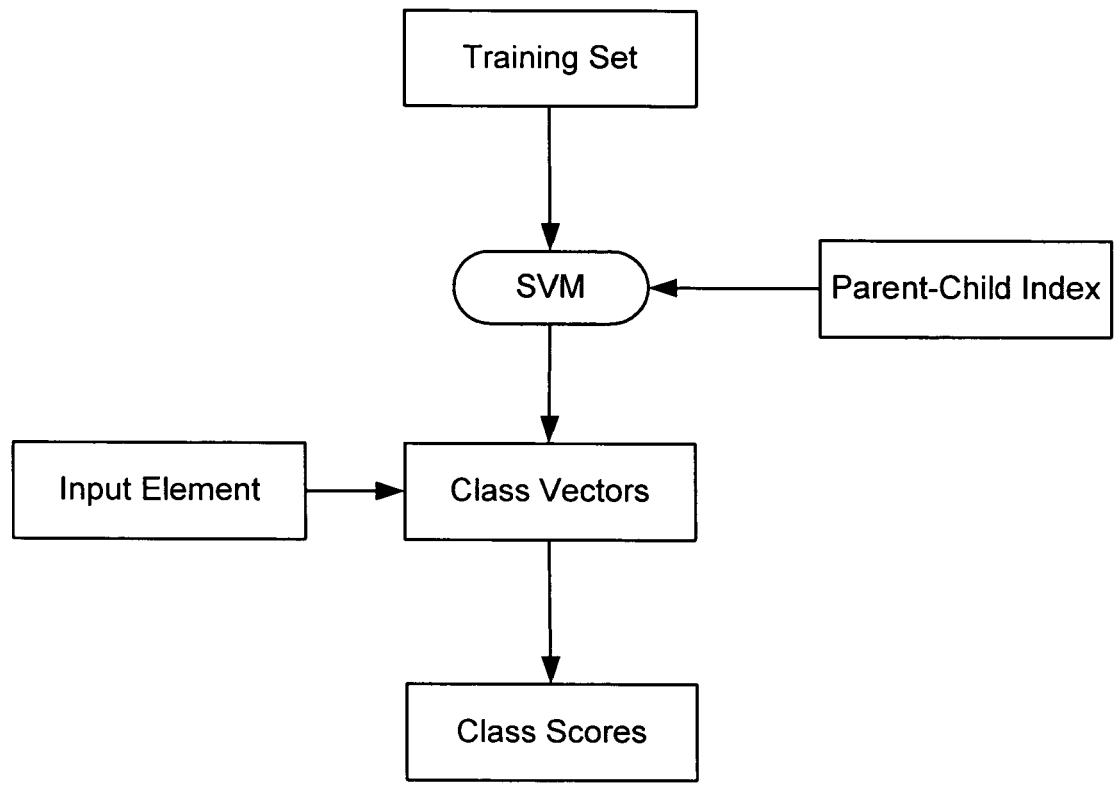
FIG. 15 illustrates a support vector machine.

This section describes an SVM unit that might use structural-textual characterization as described above. FIG. 15 illustrates such a system. The box labeled "training set" indicates a set of inputs to the classifier training algorithms. The classifier training algorithm is an SVM-based process that accepts training sets of XML element nodes which are partitioned into positive and negative examples.

The output of the SVM component is, for each input training set, a single class vector, which represents, in order, from most discriminating to least discriminating, the combinations of terms that distinguish positive training examples from the negative training examples.

The SVM component operates by forming, for each training input, an element vector that represents an approximation to the frequency of occurrence of each term in the element. These approximate term frequencies can be stored, for each term, directly in the parent-child index as score values. The parent-child index includes numerous terms that encode structural-textual information.

The training examples comprise a set of positive element nodes and negative element nodes that have been externally selected for their quality as discriminators for the class in question. Each training example is loaded to the database, and terms of types (a)–(p) (see Table 1, above) are extracted. Note that Table 1 is just one possible set of term types. The score value stored in the database for each such term is stored into the element vector for the training example.

A "vector" is a list of numbers. Two vectors of the same length may be added together (item by item), or subtracted (item by item). A vector may be multiplied by a constant (across every item in the list). For example, (1, 2, 3)+(4, 5, 6)=(5, 7, 9)

(4, 5, 6)−(1, 2, 3)=(3, 3, 3)

5 * (1, 2, 3)=(5, 10, 15).

The (abstract) set of all possible lists of numbers of some fixed length n forms an "n-dimensional vector space". In addition to these arithmetic operators, one may form the "scalar product" of two n-dimensional vectors by taking the sum of pairwise products. We denote the scalar product of two vectors u, v as <u, v>. For example,

<(1,2,3), (3,4,5)>=1*3+2*4+3*5=3+8+15=26.

Two n-dimensional vectors are defined to be "perpendicular" if, by analog with the situation in 2 or 3 dimensions, the scalar product of the two vectors equals 0. For example,

⟨(1, 1, 1), (1, 0, −1)⟩=0.

The training example element vector is a sparse vector, meaning that although it might, in principle, contain one entry for every term stored in the database index, in practice any given element contains few distinct terms, and the vector only needs to store non-zero entries corresponding to the terms actually appearing in the element.

The sparse vector representation comprises a list of pairs (index, value), where the index indicates the index item index position in the vector, and value indicates the score value corresponding to the given index position.

Methods are available for computing scalar products between sparse vectors, and between sparse vectors and dense vectors (those with few zero entries, and stored as preallocated, fixed sized arrays of values).

The element vectors for the training examples are fed into the support vector machine ("SVM") unit. A support vector machine attempts to find the "maximum margin" separating hyperplane between the set of positive training element vectors and the set of negative training element vectors. A "hyperplane" comprises all the points in an n-dimensional vector space that are perpendicular to one given vector, and displaced in the direction of that vector by some fixed amount. For example, in two dimensions, a hyperplane is just a line, where the line comprises all the points x=(x1, x2) whose scalar product with the vector v=(v1, v2) equals some number b. The larger the value of b, the further L will be displaced along the direction of the vector v.

The SVM unit finds the analog of a line that is the best possible separator between the positive example points and negative example points. "Best possible" in this context means the hyperplane with the largest possible minimum perpendicular distance from any positive training point on one side of the hyperplane or any negative training point on the other side of the hyperplane. In might not be possible to locate any hyperplane that has all the positive examples on one side and all the negative examples on the other side. In such cases, cross-over points are allowed but the metric defining "best fit" is assessed a penalty for each such point that appears on the wrong side (i.e., negative points on the positive side of the hyperplane and positive points on the negative side of the hyperplane).

The output of the SVM unit for each training set is a single {vector, scalar} result representing the best separating hyperplane. For example, {v, b} represents the separating hyperplane H={x:⟨v, x⟩≥b}. The SVM algorithm is sensitive to changes in the values of the support points, and insensitive to changes in the positions of non-support points.

The output of the SVM unit can be stored in the subtree-structured XML database as XML fragments. This allows the XQE database system to directly access the separator hyperplane vectors. For each XML element loaded into the database that passes through the XQE classifier unit, the XQE classifier unit computes:

(1) the element vector u of the newly added element;
(2) for (each classifier {v, b}) the metric m_v(u)=⟨v, u⟩−b;
(3) sort the list of values m_v(u) in descending order;
(4) store an XML fragment in the database representing an upper segment of the sorted list of classifier values m_v(u). The size of this segment is an adjustable parameter to the XQE system.

Embodiments of the present invention provide for characterization of XML documents and fragments. While the invention has been described with respect to specific embodiments, one skilled in the art will recognize that numerous modifications are possible. The data structures described herein can be modified or varied; particular contents and coding schemes described herein are illustrative and not limiting of the invention. Any or all of the data structures described herein (e.g., forests, stands, subtrees, atoms) can be implemented as objects using CORBA or object-oriented programming. Such objects might contain both data structures and methods for interacting with the data. Different object classes (or data structures) may be provided for in-scratch, in-memory, and/or on-disk objects. Examples of methods are described and some objects might have more or fewer objects.

Additional features to support portability across different machines or different file system implementation, random access to large files, concurrent access to a file by multiple processes or threads, various techniques for encoding/decoding of data, and the like can also be implemented. Persons of ordinary skill in the art with access to the teachings of the present invention will recognize various ways of implementing such options.

Various features of the present invention may be implemented in software running on general-purpose processors, dedicated special-purpose hardware components, and/or any combination thereof. Computer programs incorporating features of the present invention may be encoded on various computer readable media for storage and/or transmission; suitable media include suitable media include magnetic disk or tape, optical storage media such as compact disk (CD) or DVD (digital versatile disk), flash memory, and carrier signals adapted for transmission via wired, optical, and/or wireless networks including the Internet. Computer readable media encoded with the program code may be packaged with a device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. In an XML handling system, wherein XML datasets are stored in structured forms, a computer-implemented method of characterizing an XML dataset comprising:
   examining the XML dataset to find a match against a content sequence query expression;
   examining the XML dataset to find a match against a content structure query expression; and
   classifying the XML dataset into one or more of a plurality of classifications, wherein the classifying of the XML dataset is dependent on whether the content sequence query expression is found and on whether the content structure query expression is found.

2. The method of claim 1, wherein XML datasets are classified using a support vector machine.

3. The method of claim 1, wherein the XML dataset is implemented as an object using CORBA or object-oriented programming.

4. The method of claim 3, wherein the object comprises a data structure and method for interacting with data.

5. In software running on general-purpose processors, wherein XML datasets are stored in structured forms, a computer-implemented method of characterizing an XML dataset comprising:

examining the XML dataset to find a match against a content sequence query expression;

examining the XML dataset to find a match against a content structure query expression; and classifying the XML dataset into one or more of a plurality of classifications, wherein the classifying of the XML dataset is dependent on whether the content sequence query expression is found and on whether the content structure query expression is found.

6. The method of claim 5, wherein the software is encoded on a computer readable media.

* * * * *